United States Patent [19]

Moore

[11] 4,197,655
[45] Apr. 15, 1980

[54] GYROSCOPIC METHOD AND APPARATUS FOR DETERMINING MAGNETIC HEADING AND ATTITUDE

[75] Inventor: Nathaniel N. Moore, Lake Hopatcong, N.J.

[73] Assignee: Cessna Aircraft Company, Wichita, Kans.

[21] Appl. No.: 849,831

[22] Filed: Nov. 9, 1977

[51] Int. Cl.² ................. G01C 19/00; G01C 19/38
[52] U.S. Cl. .................................. 33/318; 33/352; 33/361; 74/5.47
[58] Field of Search ............... 33/316, 317 R, 317 D, 33/318, 319, 352, 361, 362, 363; 324/244, 246, 247, 258; 364/453, 454; 74/5.47

[56] References Cited

U.S. PATENT DOCUMENTS

| | | | |
|---|---|---|---|
| 2,049,232 | 7/1936 | Sydnes | 33/362 |
| 2,201,559 | 5/1940 | Moseley | 33/319 |
| 2,315,216 | 3/1943 | Moller et al. | 33/316 X |
| 2,603,767 | 7/1952 | Ferrill | 33/362 |
| 2,737,054 | 3/1956 | Wendt | 74/5.47 |
| 3,858,328 | 1/1975 | La Rose | 33/319 |
| 4,013,946 | 3/1977 | Lewis | 33/362 |

*Primary Examiner*—William D. Martin, Jr.
*Attorney, Agent, or Firm*—Jim Zegeer

[57] ABSTRACT

A gyroscopic device of the type having a short-circuited rotor winding or conductor so shaped so as to produce axial and radial flux components when rotated in the earth's magnetic field is coupled to a coaxial sensing coil coaxial which gyroscopically stabilized thereby, signals induced in the sensing coil due to the axial flux component of the rotor is used to derive magnetic heading information and there is provided at least one further coil on the supporting body and inductively linked to the sensing coil and rotor such that when the sensing coil is gyroscopically stabilized by the rotor, the coil supported on the supporting body in relation to the gyroscopically stabilized sensing coil is such that any changes in angular orientation of the supporting body relative to the gyroscopically stabilized sensing coil introduces changes in the signal voltages induced in the coils. The further coil on the supporting body may be excited with one or more excitation signals of a frequency different than the angular speed of the rotor and constituted by pairs of orthogonally related coils on all three axes, namely, the roll, pitch and yaw axes. The coil located on the yaw axis is coaxial with the gyroscopically stabilized sensing coil in the rest position and is used for eliminating ambiguities.

23 Claims, 2 Drawing Figures

GYROSCOPIC METHOD AND APPARATUS FOR DETERMINING MAGNETIC HEADING AND ATTITUDE

BRIEF DESCRIPTION OF THE BACKGROUND ART AND THE INVENTION

The present invention is directed to a method and apparatus for determining the angular relationship between a vertically oriented, gyroscopically stabilized mass and its supporting movable body and for providing a magnetic heading of the supporting movable body as it traverses a given path on the earth. Conventional vertical gyroscopes are devices which have a gyroscopically stabilized mass which aligns itself with the earth's vertical so that departures of the supporting body relative to the gyroscopically stabilized mass are sensed for display and various control purposes. Such vertical gyroscopes have a two-gimbal system wherein mechanical angular motion of the gyroscopically stabilized mass presents itself in angular rotation of one or both of the gimbals relative to the supporting body upon which the gyroscope is affixed. Conventionally, this gimbal angular rotation is electrically measured by a sensor of some type, such as synchros, potentiometers, E pick offs, etc. and in these types of systems, the physical location required for the sensors introduces several undesirable features such as additional weight to the gimbals, additional gimbal rotation or friction due to wiring required to the sensors through slip rings and, at the most critical locations, space at the gimbal pivot points. Many attempts have been made to arrive at a solution to these problems by way of inductive couples, optical couples and the like, however, these devices represent relatively complex and expensive solutions to the pick off problem and at the same time, do not provide magnetic heading information which is usually provided by a separate gyroscope and/or flux gate compass.

Attempts have been made in the past to combine an earth inductor compass with a gyro vertical or gyroscopic artificial horizon but for various reasons these have not found acceptance in the art and conventionally, the magnetic heading information and the attitude information have been developed by separate gyroscopic instrumentalities and flux gate compasses. An example of a prior art effort to combine an earth inductor compass with a gyro vertical or gyroscopic artificial horizon is illustrated in Bentley U.S. Pat No. 2,176,197 wherein the earth inductor coil is used for driving a stroboscopic element for displaying heading and the roll and pitch attitude signals are displayed by means of mechanical movement of an artificial horizon. Utilization of a rotating field leakage of an electric gyro rotor in conjunction with a stationary coil element for sensing attitude changes by virtue of relative changes in angular orientations of the gyroscope rotor is illustrated in Wendt U.S. Pat. No. 2,737,054. In the Wendt patent, a pair of substantially annular coils mounted in a plane parallel with the main gimbal and major gyro axis of a three axis directional gyroscope has the leakage flux of the stator windings coupled to the coil in phase relationships which are directly related to the angular orientation of the coils with respect to the spin axis. Magnetic heading was not available from this device. It is also known to use a notched cylinder as a shorted coil for rotation at high speed in the earth's magnetic field and coupling to currents flowing in the shorted coil by transformer action to detect magnetic directions. Such a system is shown in Sydnes U.S. Pat. No. 2,049,232 who discloses the use of a pair of orthogonal coils for developing signals corresponding to reference position of the rotor so that the direction of the earth's magnetic field can be determined by phase comparisons in a phase comparator, with the rotor of that device being driven by an electrical motor or by high pressure air turbine with the shaft and associated coils all kept in a vertical stationary position relative to the supporting body by means of a gimbal suspension system. In Lewis U.S. Pat. No. 4,013,946, there is disclosed an earth inductor system in which the rotor is a shorted electrical path and that device utilized a shaft angle encoder in one embodiment for providing a signal corresponding to the rotor reference position and, in a second embodiment, an excitation coil, fixed with respect to the axis of the rotor, is used for generating a tertiary magnetic field at a frequency different from the field induced in the shorted winding by rotation of the rotor in the earth's magnetic field and this tertiary magnetic field induces a current flow in the shorted winding which produces a fourth magnetic field which is detected to produce an electrical signal which is utilized as a reference with respect to the signal produced by the rotation of the shorted winding in the earth's magnetic field. No attitude information was available from this device.

In accordance with the present invention, a gyroscopic device, preferably a vertical gyro, is provided with a short circuited rotor winding which is so shaped and oriented with respect to the spin axis as to produce an axial flux component and a radial flux component when the vertically maintained rotor is rotated in the earth's magnetic field. A fixed coil coaxial with the rotor and gyroscopically stabilized thereby acts as the secondary of a transformer with the electromotive force induced therein being due to the axial flux component of the rotor. In addition, at least one further coil affixed to the supporting body with respect to the gyro rotor is linked to the radial flux component and is relatively angularly movable in relation to the rotor so that a first electrical signal voltage component is induced in the fixed coil which has a phase dependent upon the angular position of a gyroscopic device with respect to the earth's magnetic field, a second electrical signal voltage component is induced in at least a pair of the angularly related coils which have a phase independent of the angular position of the gyroscope with respect to the earth's magnetic field but are quadrature voltages of double the frequency of the first electrical signal and have amplitudes dependent upon the angular relationship between the axis of the rotor and the axis of the second coils and a frequency which is harmonically related to the rotor frequency and a phase which is independent of the direction of the earth's magnetic field. This system thereby provides both magnetic heading information and attitude information in a single vertical gyro. By providing a further set of coils on the supporting body which are coaxially aligned initially with the gyroscopically stabilized coil, the system is capable of measuring the magnitude and direction of angles through 360 degrees without ambiguity in a gimballed vertical gyro system. The coils which are stationary with respect to the supporting body and orthogonally related with respect to each other are used to excite the sensing coil which is gyroscopically stabilized by the rotor. In such case, each set of excitation coils is supplied at an alternating current frequency which is sufficiently different from the other coil's excitation frequencies that frequency discrimination of the various electrical signal components of the sensor coil output voltage is possible.

BRIEF DESCRIPTION OF THE DRAWINGS

The above and other objects, advantages and features of the invention will become more apparent when considered in conjunction with the following specification and accompanying drawings wherein.

DETAILED DESCRIPTION OF THE INVENTION

Figure 1:
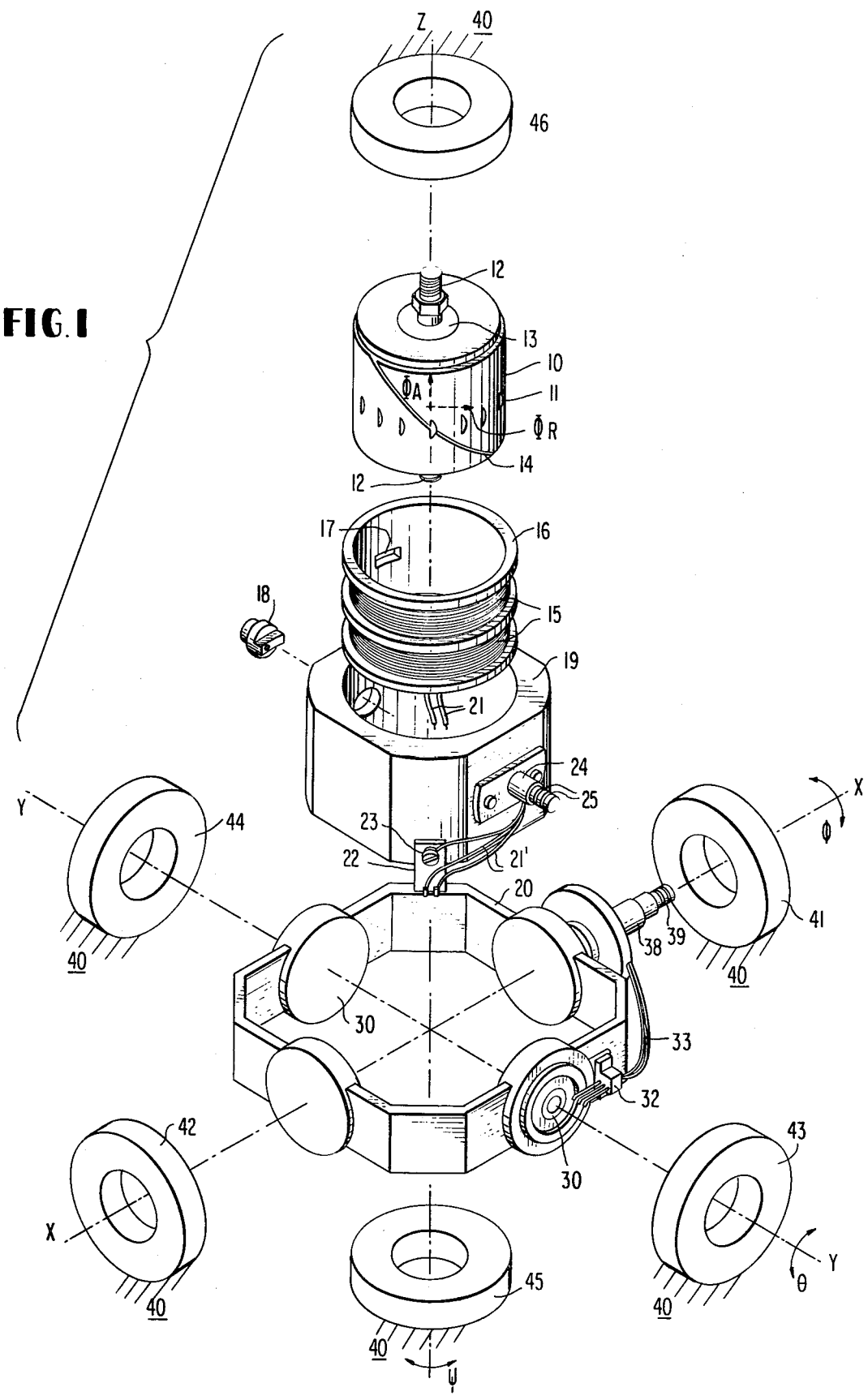
FIG. 1 is an isometric and partially diagrammatic illustration of a vertical gyroscope incorporating the invention.

In FIG. 1, a preferred embodiment of the invention is disclosed as utilizing a conventional pneumatically driven vertical gyroscope rotor 10 having formed in a periphiral surface thereof turbine pockets 11, mounted on mounting shaft 12 by bearing assembly 13 (there being an upper and a lower bearing assembly with the lower bearing assembly not being illustrated). A slot or notch 14 cut at an angle of 45 degrees to the area in the exterior surface of rotor 10 forms a shorted coil earth inductor which is rotated in the earth's magnetic field in the same manner as described in the Sydnes patent referenced above. Coaxial with gyroscope rotor 10 is field sensing unit, such as coil 15 which is a single coil but is split into two halves on coil form 16. An aperture 17 in the wall of coil form 16 receives an air jet nozzle 18 which, in turn, is supplied with air in a conventional manner via a bearing 30 in gyro casing 19 and through main gimbal ring 20 to a supply external to the unit. Typically, the housing (not shown) for the entire assembly is placed under a vacuum and air is drawn through the gimbal to pivot 30 and air jet nozzle 18. The air issuing through jet nozzle 18 to impinge on the turbine blade elements or pockets 11, and hence constituting exhaust air, is taken from the closed bottom (not shown) or gyro casing 19. The bottom of the gyro casing 19 is provided with a conventional pneumatic erection system (not shown) which can consist of, for example, jet nozzles on the lower side of the casing which are controlled by pendulously operated or other gravitationally operated shutters (not shown). While the pneumatic erection system is preferred so as to avoid extraneous magnetic fields, with proper magnetic shielding, electric torque motors may be used in the erection system and the gyro rotor may be electrically driven.

Leads 21 from sensing coil 15 are passed through gyro casing 19 to connect to a terminal block 22 mounted on the exterior of gyro casing 19 by means of a grounding screw 23. Leads 21' from the terminal block 22 along with grounding lead 23' are passed through a conventional stub shaft slip-ring assembly 24 to a conventional slip-ring assembly 25. A cover plate (not shown) is applied to the upper surface of the gyro casing 19 so as to provide a support for shaft 12 of gyro rotor 10. The gyro rotor 10 is mounted so as to be precisely concentrically oriented with respect to sensing coil 15 and sensing coil 15 which is secured in gyro casing 19 is thus maintained in a fixed relation at all times with respect to the rotary axis of the gyro rotor 10.

Main gimbal 20 is conventional and is provided with bearings 30—30 for receipt of the mounting shafts for gyro casing 19. Brushes 31 ride upon slip-rings 25 and are maintained in position by brush holder 32. Electrical leads 33 are normally carried in main gimbal frame 20 but are shown spaced therefrom for purposes of illustration in FIG. 1. Thus, the gyro housing 19 is mounted with shaft 24 in axial alignment along the Y—Y axis in conventional gyroscope mounting fashion. The main gimbal element 20 is mounted in bearing (not shown) on the supporting body by means of a shaft 38 along the X—X axis and a further mounting shaft which is not shown. These are conventional mounting techniques and, in fact, what has been described in relation to the gyro elements proper such as the rotor (without slot or notch 14) and without sensing coils 15 and their pertinent electrical connections, is a standard, commercially available vertical gyroscope assembly. Leads 33, which connect with sensing coil 15, are carried through the shaft 38 to a further slip-ring assembly (not shown) and thence to the electrical signal processing circuitry. The supporting body, which in the preferred embodiment is an aircraft, is designated by the numerals 40 as a stable base.

With reference to the gyro motor 10, sensing coil 15, and gyro housing 19, these constitute a gimballed mass and are attached to the supporting body 40 through the gimbal bearings (not shown). If the rotational axis X—X is aligned with the fore and aft axis of the movable body, such as an aircraft, relative rotation about this axis will be proportional to roll of the movable body. Conversely, rotation about the Y—Y axis through their respective gimbal bearings (not shown) is proportional to the pitch of the movable body about the pitch axis thereof. Sensing coil 15 in this arrangement is gyroscopically stabilized by the gyroscopic action of rotor 10 and the erection system and its position remains essentially rigid or fixed in space and thus constitutes a reference axis for attitude displacements of the supporting body 40.

Figure 2:
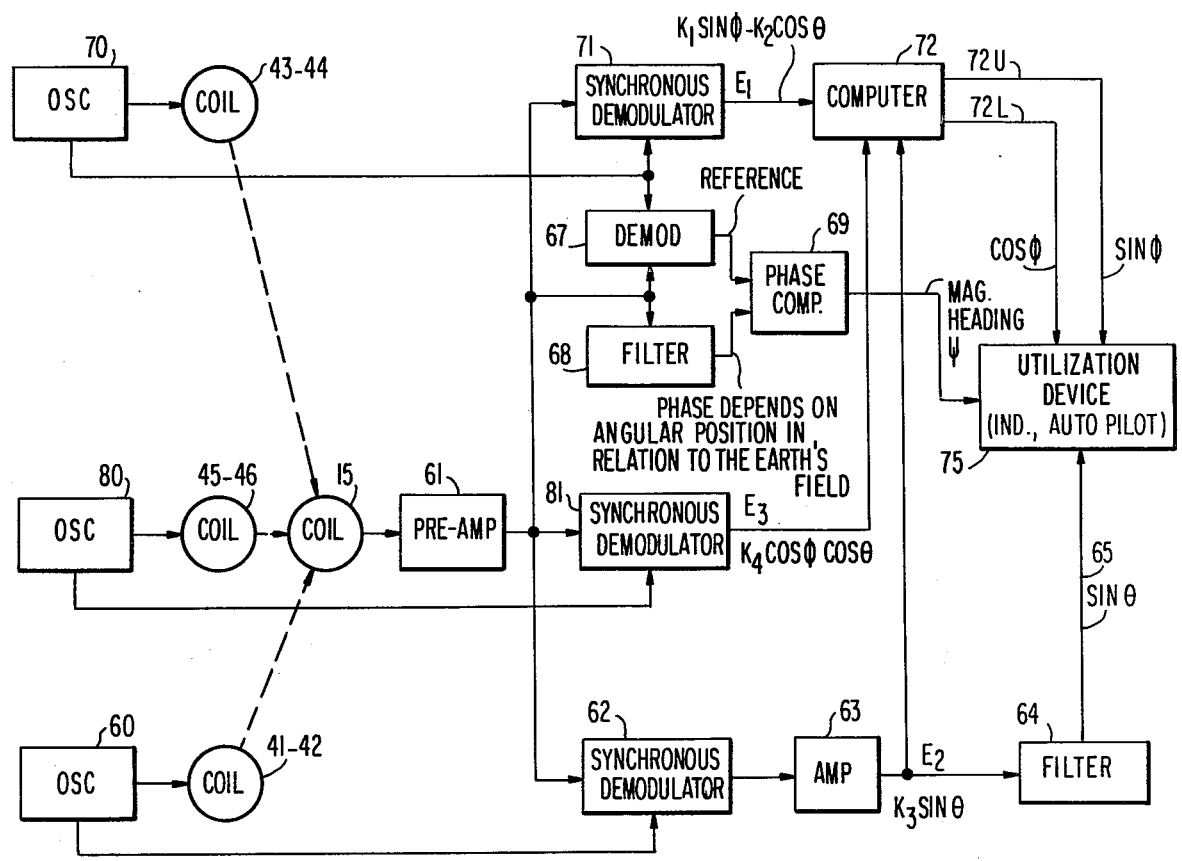
FIG. 2 is a block diagram of one electrical system for utilizing signals generated by the system illustrated in FIG. 1.

As shown in FIG. 2, in a preferred embodiment, a heading information signal is derived from signals induced in coil 15 by rotation of the gyroscope rotor 10 in (1) the earth's magnetic field and (2) a rotor reference position signal due to rotation in one of the transverse excitation fields established by roll or pitch excitation coils 41-42 or 43-44 to establish a reference position of the rotor with respect to the support body 40. The phase of the rotor reference position signal varies with rotation of the rotor and is independent of the relationship of the earth's magnetic field, whereas the phase of the signal induced in coil 15 due to rotation of gyroscope rotor 10 in the earth's magnetic field is dependent upon the position of the rotor in the earth's magnetic field so that by comparing the phases of these two signals, a signal corresponding to magnetic heading is produced. The rotor reference position signal developed by demodulator 67 uses, in the preferred embodiment, the pitch excitation oscillator 70 as a source of discrimination signals to extract only signals induced in coil 15 which are due to the pitch axis excitation field. The signal induced in coil 15 due to rotation of rotor 10 in the earth's field is extracted by a filter 68 which is set for the frequency of rotation of rotor 10. These signals are applied to the phase comparator 69 which produces a heading signal which, in turn, is applied to utilization device 75. Utilization device 75 may be an indicator, auto pilot, transponder or some servo or other utilization device.

SENSING MAGNETIC HEADING

Coils 41, 42 are mounted on the supporting body 40 and in coaxial alignment with the X—X axis whereas coils 43, 44 are likewise mounted on the supporting body 40 but are coaxial with the Y—Y axis. It will be appreciated that instead of pairs of coils, a single coil may replace each of coils 41, 42 and 43, 44. Coils 45, 46 are likewise mounted rigid with the supporting body 40 and coaxial with the Z or yaw axis of the gyroscopic body. Coils 45 and 46 may likewise be combined into a single coil but electrical balance is provided in these coils by splitting them in the fashion shown. In the system as thus far described, if the spin axis of the vertical gyro rotor 10 is exactly at 90 degrees or orthogonally related with respect to the X and Y axes, the voltages induced in sensing coil 15 will be identical in phase and frequency to the voltages induced in coils 45 and 46 and the phase of this voltage will be dependent upon the position of the rotor in the earth's magnetic field. Voltages induced in coils 41-42 and coils 43-44 are quadrature currents which are double the frequency of the voltage induced in coil 15. Multiplication of the voltage induced in sensing coil 15 by two (to make the frequency the same as in the quadrature windings 41-42 and 43-44) permits the voltages induced in the quadrature windings 41-42 and 43-44 to be compared with the phase of the voltage in sensing coil 15 to thereby determine the direction of the earth's magnetic field in the same manner as disclosed in the above-referenced Sydnes patent. The excitation signal from the pitch coils 41-42 (described more fully hereafter) as influenced by the rotor and sensed in sensing coil 15 can be used to derive a reference position for the rotor as described in the above referenced Lewis patent. Alternatively, an optically sensed mark on the rotor may be used to establish a reference position for the rotor. These and other rotor referencing techniques known in the earth inductor art may be used in practicing the invention hereof.

ATTITUDE SENSING

If quadrature coils 41-42 and 43-44 are excited with different frequency alternating currents, alternating current fields of those frequencies are produced in which sensing coil 15 lies. When the yaw axis Z—Z through the rotor 10 is at right angles to the roll axis X—X, the current induced in sensing coil 15 due to the magnetic field produced by the excited coils 41-42 is minimal. When the movable supporting body 40 rotates about the pitch axis Y—Y, the angle between the roll axis X—X and yaw axis Z—Z changes, thereby changing the angular relationship of sensing coil 15 to coils 41-42. The change in this angular relationship will result in a current being induced in sensing coil 15 which is a function of the sine of the angle between axes X—X and Z—Z.

In like manner, rotation about the X—X axis will change the angular relationship of sensing coil 15 to the field created by the coils 43-44 which will induce a current in coil 15 proportional to the sine of the angle between the axes Z—Z and Y—Y. Moreover, the relationship between the coils is such that the angle between the axes Z—Z and X—X will not affect the current induced in sensing coil 15 due to any excitation currents in coils 43-44. In this case, the angle between the Y—Y and Z—Z axes will affect the current induced in sensing coil 15 due to the field produced by excitation currents in coils 43-44. This system is suitable where the angular displacements between the axes X-Y and Y-Z are less than 90 degrees. If the angles exceed 90 degrees, ambiguities can exist and coils 45 and 46 on the Z—Z axis provide the necessary intelligence to resolve any ambiguity. The ambiguity is only applicable in the relationship of axis Y-Z because in most conventional vertical gyroscope devices there are physical stops (not shown) in the X-Z relationship at slightly less than 90 degrees. These stops are basically to prevent what is commonly termed gimbal lock and are not disclosed in the instant application since only those parts of the conventional prior art apparatus necessary to shown the relationship of the new elements have been disclosed.

As shown in FIG. 2, oscillator 60 excites coils 41-42 at a finite frequency A. Coils 41-42 produce an alternating current field which induces a current in sensing coil 15 proportional to their angular relationships. This induced current is amplified by preamplifier 61 and frequency discriminated and demodulated by synchronous demodulator 62. The resultant signal is amplified by amplifier 63 and filtered by filter 64, resulting in an electrical signal present at output line 65 which is proportional to the sine of the angle between coils 15 and 41-42. The signal on line 65 is supplied to utilization device 75, which may be an auto pilot, indicator, servo, etc. It may also simply interface the attitude and heading signals with conventional instrumentation such as aircraft instrumentation.

Oscillator 70 excites coils 43-44 at a finite frequency B. Coils 43-44 produce an alternating current field which induces a further current in coil 15 which is proportional to their angular relationships. This induced current is also amplified by preamplifier 61, frequency discriminated and demodulated by frequency discriminator/demodulator 71, and the resultant signal is then used as one input signal by the trigonometric computer 72 to obtain a resultant which is proportional to the sine of the angle between axes Y—Y and Z—Z. The trigonometric computer for roll angles less than 90 degrees requires the additional input from amplifier 63 which is a function of the relationship between axes X—X and Z—Z.

If angles between axes Y—Y and Z—Z exceeding 90 degrees are to be measured, oscillator 80 excites coils 45-46 at a finite frequency C. Coils 45-46 produce an alternating current field which induces a current in coil 15 proportional to their angular relationships. It should be noted that coils 15 and 45-46 are coaxial so maximum signal amplitude occurs when the gyro rotor is vertical and the axis of this coil 45-46 is also vertical. Deviations from vertical introduce a voltage change which has an amplitude proportional to the cosine of the angular change. This induced current is amplified by preamplifier 61 and frequency discriminated and demodulated in synchronous demodulator 81, and the resultant is fed to trigonometric computer 72 where it is utilized to solve the ambiguous relationship of coils 43-44 and 15.

The output of each oscillator 60, 70 and 80 is also fed to its corresponding synchronous demodulators 62, 71 and 81 such that the output of the discriminator contains the data proportional to the angular relationship between the appropriate coils. In FIG. 2, these are indicated as $E_1$, $E_2$ and $E_3$. The following analysis discloses the relationships of these entities.

Rotation about the X axis shall be called roll and shall be designated by the Greek letter $\phi$.

Rotation about the Y axis shall be called pitch and referred to by the Greek letter $\theta$.

Signals induced in coil 15 due to excitation of coils 43–44 are referred to as $E_1$. Likewise, signals induced by voltages impressed on coil 15 by coils 41–42 shall be referred to as $E_2$, and signals induced in coil 15 by coils 45–46 shall be referred to as $E_3$. All constants indicated are invariant with reference to angular deflections. However, they contain signals that can be discretely measured by frequency conscious discriminators or synchronous demodulators 62, 71 and 81.

The following three equations show the signals induced into coil 15 by excitation of the three sets of case-mounted coils 41–42, 43–44 and 45–46:

$$E_1 = K_1 \sin \phi \cdot K_2 \cos \theta \qquad \text{Equation 1.}$$

$$E_2 = K_3 \sin \theta \qquad \text{Equation 2.}$$

$$E_3 = K_4 \cos \phi \cos \theta \qquad \text{Equation 3.}$$

Equation 2 ($E_2$) provides unambiguous pitch measurement information and is the output of amplifier 63. To obtain roll information, the following mathematical manipulations must be accomplished:

From Equation 1 we see that if a signal proportional to $\cos \theta$ can be developed, then division of this signal into Equation 1 will provide a signal proportional to $\sin \phi$.

We also know from trigonometric relationships that the following relationship holds:

$$\cos^2 \alpha + \sin^2 \alpha = 1 \qquad \text{Equation 4.}$$

Taking Equation 2 and squaring both sides of the relationship, we obtain $$E_2^2 = K_3^2 \sin^2 \theta \qquad \text{Equation 5.}$$

From Equations 4 and 5, we can obtain $$K_3^2 \cos^2 \theta = K_3^2 - K_3^2 \sin^2 \theta \qquad \text{Equation 6.}$$

Therefore, $$K_3^2 \cos^2 \theta = K_3^2 - E_2^2 \qquad \text{Equation 7.}$$

Taking the square root of both sides of Equation 7, we obtain $$K_3 \cos \theta = \sqrt{K_3^2 - E_2^2} \qquad \text{Equation 8.}$$

Dividing Equation 8 into Equation 1, we obtain $$E_1/K_3 \cos \theta = K_1 K_2/K_3 \cdot \sin \phi \qquad \text{Equation 9.}$$

Solving for $\sin \phi$ in Equation 9 and substituting Equation 8, we obtain $$\sin \phi = K_3/K_1 K_2 \cdot E_1/\sqrt{K_3^2 - E_2^2} \qquad \text{Equation 10.}$$

Equations 2 and 10 provide unambiguous pitch and roll information for angles not exceeding 90 degrees. Since the pitch axis is constrained to levels less than 90 degrees, Equation 2 is all that is required to determine pitch axis attitude information. However, since the roll axis is capable of rotation up to 360 degrees, an additional relationship for roll angle is required.

Division of Equation 3 by Equation 8 will provide a signal proportional to the $\cos \phi$. Solving, we obtain $$\cos \phi = K_3/K_4 K_5 \cdot E_3/\sqrt{K_3^2 - E_2^2} \qquad \text{Equation 11.}$$

Now having both $\sin \phi$ and $\cos \phi$, we have an unambiguous measurement of the roll angle.

A conventional trigonometric computer 72 solves Equations 10 and 11 and provides on line 72u the solution to Equation 10 ($\sin \phi$) when the roll and pitch angles do not exceed 90 degrees and the solution to Equation 11 ($\cos \phi$) and unambiguous measurements of all attitude angles.

While I have shown and described a specific embodiment of the invention, further modifications and improvements are possible. Instead of coils 15, Hall effect devices may be used, as one example. Instead of separate oscillators for each axis of excitation, a single source may be used from which all frequencies required can be synthesized. Moreover, all electrical components and circuitry may be formed as a single integrated circuit or chip. All such modifications as will be obvious to those skilled in the art and which do not depart from the spirit and scope of the claims appended hereto are intended to be embraced by the claims.

I claim:

1. A method of detecting attitude changes of a body traversing a given path, and having a gyroscope means including a gyroscope rotor comprising gyroscopically stabilizing a magnetic field sensor in axial alignment with the spin axis of said gyroscope rotor, establishing at least a pair of transversely related alternating current magnetic fields, each said alternating current magnetic field being fixedly oriented with respect to said body and axially intersecting said magnetic field sensor on the spin axis of said gyroscope rotor so that signals generated by the alternating current magnetic fields in said gyroscopically stabilized magnetic field sensor are equal and zero as to each said alternating current magnetic field, and indicating the generation of a signal in said gyroscopically stabilized magnetic field sensor upon changes in the axial orientation of any of said pairs of transversely related alternating current fields as a function of the angle of change in axial orientation, respectively.

2. The invention defined in claim 1 wherein each said pair of transversely related alternating current magnetic fields are of substantially different frequency and are simultaneously established and applied to said gyroscopically stabilized magnetic field sensor.

3. The invention defined in claim 1 wherein said gyroscopically stabilized magnetic field sensor is a coil and each of said transversely related alternating current magnetic fields are established by a pair of orthogonally spaced coils having axes normal to the axis of the gyroscopically stabilized coil.

4. The invention defined in claim 1 including a further coil fixed with respect to said pair of transversely spaced coils and having an axis coaxial with the axis of said spin axis and the axis of said gyroscopically stabilized coil, exciting said further coil with an electrical signal having a frequency significantly different than the frequencies of said transversely alternating magnetic fields, and using any signal departure in said sensing coil of said further coil to resolve ambiguities in the direction of change in angular orientations of said transversely related coils with respect to the spin axis of said gyroscope rotor.

5. The invention defined in claim 1 wherein the step of indicating the generation of a signal in the gyroscopically stabilized magnetic field sensor includes supplying the signal generated in said gyroscopically stabilized magnetic field transducer to a pair of synchronous demodulators and indicating the angular change about each axis of said pair of transversely related alternating current magnetic fields intersecting the spin axis of said gyroscope rotor.

6. The invention defined in claim 1 wherein said gyroscope rotor includes a closed loop conductor which is rotated in the earth's magnetic field, said gyroscopically stabilized magnetic field transducer being inductively coupled to said closed loop conductor to produce a further signal voltage which is a function of the orientation of the rotor in the earth's magnetic field and a frequency corresponding to the angular speed of said rotor and significantly different from the frequencies of said pair of transversely related alternating current fields and using one of said alternating current fields to establish a reference position of said rotor with respect to the body and determining the direction of the earth's magnetic field relative to said body
 by comparing the phase of the voltages induced in said magnetic field sensor by said closed loop conductor rotating in the earth's magnetic field and the said one of said alternating current fields.

7. A method of measuring the changes in angular relationship of the rotary axis of a gyroscopically stabilized rotating mass and its supporting body as said supporting body traverses a given path, said rotating mass having a non-rotating gyroscopically stabilized coil axially and concentrically aligned, externally of said rotating mass and gyroscopically stabilized thereby and stationary with respect to the rotary axis, comprising the steps of:
 (1) establishing a first magnetic field traversing said first coil and having an axis which is fixed relative to said supporting body,
 (2) sensing the field produced in said non-rotating gyroscopically stabilized coil upon relative changes in the axis of said rotating mass and the axis of said non-rotating gyroscopically stabilized coil and producing an electrical signal,
 (3) converting said electrical signal to a signal proportional to change in angular orientation of said magnetic field on supporting body relative to said non-rotating gyroscopically stabilized coil and the rotary axis of said gyroscopically stabilized mass, and
 (4) applying same to a utilization device.

8. The invention defined in claim 7 wherein said rotating mass includes a short-circuited conductor loop and the step of sensing senses the field produced in said short-circuited conductor means by rotation thereof in the earth's magnetic field and the said field traversing said non-rotating gyroscopically stabilized coil and producing a heading signal corresponding to magnetic heading, and applying said heading signal to a utilization device.

9. The invention defined in claim 7 including means for establishing a second electrical field having an axis different than the axis of said first magnetic field and, said first and said second electrical fields being alternating current electrical fields of substantially differing frequencies, and being orthogonally related to one another, and the step of sensing the field in said non-rotating gyroscopically stabilized coil includes means for sensing the field for each frequency of excitation.

10. The invention defined in claim 9 including the step of combining the two sensed field signals and deriving signals proportional to angular deviation of said supporting body relative to said gyroscopically stabilized rotating mass and applying same to a utilization device.

11. In a gyroscopic device having a gimballed gyroscope rotor comprising
 a gyroscopically stabilized field sensor, said gyroscopically stabilized field sensor having an axis coaxial with the gyroscope rotor,
 at least one coil element carried on a body supporting said gimballed gyroscope rotor and having its axis transversely oriented with respect to the axis of said gyroscopically stabilized field sensor such that when said at least one coil is energized with an electrical signal, any change in angular orientation of the axis of said at least one coil relative to the axis of said gyroscopically stabilized field sensor includes a sinusoidal change in the voltage induced in said gyroscopically stabilized field sensor.

12. The device defined in claim 11 wherein said at least one coil element is constituted by a pair of coil elements having orthogonally related axes each normally orthogonally intersecting the axis of said gyroscopically stabilized field sensor, means for exciting each coil of said pair with respectively different frequencies, and means connected to said gyroscopically stabilized field sensor for detecting each signal frequency induced therein by said pair of orthogonally related coils upon departure of each from orthogonality with said gyroscopically stabilized field sensor.

13. The invention defined in claim 11 wherein said field sensor is a coil element and said gyroscope rotor is vertically and coaxially oriented in said coil element and includes a short-circuited conductor and is rotated in the earth's magnetic field at a selected rate of speed to induce current flow therein having a selected frequency, said gyroscopically stabilized field sensor coil element being inductively coupled thereto, and means for indicating the direction of the earth's magnetic field relative to said supporting body from heading signal voltages induced in said gyroscopically stabilized field sensor coil.

14. The invention defined in claim 12 including a further coil element on said supporting body having an axis orthogonal with the axis of said pair of coil elements, means for exciting said still further coil element with an alternating current signal voltage having a frequency significantly different than the frequency of the signals exciting said orthogonally related pair of coil elements, respectively, to induce an ambiguity resolving signal voltage in said gyroscopically stabilized field sensor, and supplying said ambiguity resolving signal to said means connected to said gyroscopically stabilized field sensor for resolving any ambiguity.

15. In a gyroscopic device having a gyroscope rotor supported by gimbals on a supporting body,
 a gyroscopically stabilized magnetic field transducer having an axis coaxial with the spin axis of said gyroscope rotor,
 a first alternating magnetic field producing element on said supporting body for producing and transversely oriented with respect to the axis of said field transducer, a second alternating magnetic field producing element on said supporting body transversely oriented with respect to the axis of said field transducer and radially spaced from the axis of said first field producing element, and a third alternating magnetic field producing element on said supporting body orthogonally oriented with respect to the alternating fields produced by said first and second alternating field producing elements, respectively.

16. The invention defined in claim 15 wherein said gyroscope rotor is pneumatically driven, and includes a short-circuited conductor path shaped such that rotation thereof in the earth's magnetic field induces current flow therein which generates a fourth alternating magnetic field which has a selected frequency determined by the speed of rotation of said rotor and which is a frequency significantly different from the frequency of said first, second and third alternating fields, and means connected to said magnetic field transducer for sensing the signals induced in said transducer by said alternating magnetic fields, respectively.

17. The invention defined in claim 16 wherein each said alternating field producing element is orthogonally oriented relative to each other and said third alternating field producing element is coaxially oriented with said gyroscopically stabilized field transducer, and said supporting body is an aircraft wherein said first alternating field producing element is aligned with fore and aft roll axis (X) of the aircraft, said second alternating field producing element is aligned athwartship with the pitch axis (Y) of said aircraft, and said third alternating field producing element is aligned with the vertical yaw axis of said aircraft.

18. The invention defined in claim 17 including a first, second and third synchronous demodulator means connected to said gyroscopically stabilized transducer for producing the following signal voltages:

$$E_1 = K_1 \sin \phi \cdot K_2 \cos \theta$$

$$E_2 = K_3 \sin \theta$$

$$E_3 = K_4 \cos \phi \cos \theta$$

where $\phi$ is the angle of rotation about the roll axis, $\theta$ is the angle of rotation about the pitch axis and $K_1$, $K_2$, $K_3$ and $K_4$ are constants which are invariant with reference to angular deflections.

19. The invention defined in claim 18 including means for computing the roll angle $\phi$ for all (0°–360°) angular rotations.

20. A device for detecting attitude changes of an aircraft about a horizontal axis thereof comprising a magnetic field sensor having a vertical axis aligned with the Yaw axis of the aircraft, and a gyroscope having a pneumatically driven gyro rotor for gyroscopically stabilizing said magnetic field sensor with respect to said Yaw axis, an excitation means stationarily mounted on said aircraft and having its axis coaxial with said horizontal axis and intersecting the Yaw and vertical axes of said aircraft and said magnetic field sensor, respectively, means for exciting said excitation coil with an alternating current signal having a frequency substantially different than the frequency of rotation of said gyro rotor, and circuit means connected to said magnetic field sensor to receive electrical signals therefrom indicative of a change in angular orientation of said magnetic field sensor with respect to said excitation coil.

21. The invention defined in claim 20 wherein horizontal axis includes one of the roll and/or pitch axis of said aircraft and said excitation means is constituted by a first coil having an axis aligned with the roll axis of said aircraft and a second coil aligned with the pitch axis of said aircraft, said excitation coils being excited with frequencies which are discrimintable by said circuit means connected to said field sensor.

22. The invention defined in claim 20 including one further excitation coil coaxial with the vertical axis of said field sensor for inducing ambiguity resolving signals in said magnetic field sensor.

23. The invention defined in claim 20 wherein said pneumatically driven gyro rotor has a conductive surface and a slot in said conductive surface transverse to the vertical axis whereby when said gyro rotor is rotated in the earth's magnetic field currents induced to flow in said conductive rotor surface provide a rotating flux field for inducing a signal in said magnetic field sensor indicative of magnetic north.

* * * * *